(12) United States Patent
Lee

(10) Patent No.: US 12,242,171 B2
(45) Date of Patent: Mar. 4, 2025

(54) CAMERA MODULE

(71) Applicant: LG INNOTEK CO., LTD., Seoul (KR)

(72) Inventor: Min Kuk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 129 days.

(21) Appl. No.: 18/009,412

(22) PCT Filed: Jun. 23, 2021

(86) PCT No.: PCT/KR2021/007909
§ 371 (c)(1),
(2) Date: Dec. 9, 2022

(87) PCT Pub. No.: WO2021/261922
PCT Pub. Date: Dec. 30, 2021

(65) Prior Publication Data
US 2023/0221623 A1    Jul. 13, 2023

(30) Foreign Application Priority Data
Jun. 24, 2020   (KR) .................. 10-2020-0077181

(51) Int. Cl.
*G03B 17/08*   (2021.01)
*G03B 30/00*   (2021.01)
*H04N 23/51*   (2023.01)

(52) U.S. Cl.
CPC ............. *G03B 17/08* (2013.01); *G03B 30/00* (2021.01); *H04N 23/51* (2023.01)

(58) Field of Classification Search
CPC ........ H04N 23/51; H04N 23/57; B60R 11/04; G03B 30/00
See application file for complete search history.

(56) References Cited

U.S. PATENT DOCUMENTS

| | | | |
|---|---|---|---|
| 10,283,903 B2 * | 5/2019 | Yamanaka | H01R 13/648 |
| 2015/0029337 A1 | 1/2015 | Uchiyama et al. | |
| 2018/0255213 A1 * | 9/2018 | Ahn | B60R 11/04 |
| 2019/0227411 A1 | 7/2019 | Park et al. | |
| 2020/0059580 A1 | 2/2020 | Park et al. | |

FOREIGN PATENT DOCUMENTS

| | | | |
|---|---|---|---|
| CN | 110476109 A | | 11/2019 |
| JP | 2020047369 A | * | 3/2020 |
| KR | 10-2012-0003036 A | | 1/2012 |

(Continued)

*Primary Examiner* — Leon W Rhodes, Jr.
(74) *Attorney, Agent, or Firm* — Birch, Stewart, Kolasch & Birch, LLP

(57) ABSTRACT

The present embodiment pertains to a camera module comprising: a first body comprising a lens; a second body coupled to the first body and comprising a connection portion; and a sealing member and a ground member, arranged on the connection portion of the second body, wherein the connection portion comprises a first area having a first hole and a second area having a second hole of which the diameter is greater than the diameter of the first hole, the sealing member is arranged in the second area, the ground member is arranged to be spaced apart from the sealing member, and the second area is positioned between the first area and the ground member.

18 Claims, 8 Drawing Sheets

(56) References Cited

FOREIGN PATENT DOCUMENTS

| KR | 10-2015-0014354 A | 2/2015 |
| KR | 10-2015-0104787 A | 9/2015 |
| KR | 10-2015-0142194 A | 12/2015 |
| KR | 10-2018-0042566 A | 4/2018 |
| KR | 10-2018-0122792 A | 11/2018 |

* cited by examiner

CAMERA MODULE

CROSS REFERENCE TO RELATED APPLICATIONS

This application is the National Phase of PCT International Application No. PCT/KR2021/007909, filed on Jun. 23, 2021, which claims priority under 35 U.S.C. 119 (a) to Patent Application No. 10-2020-0077181, filed in the Republic of Korea on Jun. 24, 2020, all of which are hereby expressly incorporated by reference into the present application.

TECHNICAL FIELD

The present embodiment relates to a camera module.

BACKGROUND ART

Recently, ultra-small camera modules are being developed, and ultra-small camera modules are widely used in small electronic products such as smartphones, laptops, and game consoles.

As the spread of automobiles becomes more popular, ultra-small cameras are widely used not only in small electronic products but also in vehicles. For example, black box cameras for vehicle protection or objective data of traffic accidents, rear surveillance cameras that allow drivers to monitor blind spots at the rear of the vehicle through screens to ensure safety when reversing the vehicle, and peripheral detection cameras capable of monitoring the surroundings of the vehicle, and the like are provided.

The conventional camera module has a problem of loss of assembly man-hours and an increase in unit price because a rear body is composed of two rear bodies.

DETAILED DESCRIPTION OF THE INVENTION

Technical Subject

Through the present embodiment, it is intended to provide a camera module in which the assembly process is minimized through the use of one rear body.

In addition, it is intended to provide a camera module that can be both waterproof and grounded through one hole and does not require separate parts to prevent separation of the ground member and the waterproof member.

In addition, it is to provide a camera module that reduces costs through unification of parts and by eliminating the four screws used for coupling of the conventional two rear bodies.

Technical Solution

A camera module according to the present embodiment comprises: a first body including a lens; a second body being coupled to the first body and including a connection portion; and a sealing member and a ground member being disposed in the connection portion of the second body, wherein the connection portion includes a first area having a first hole and a second area having a second hole of which the diameter is greater than the diameter of the first hole, wherein the sealing member is disposed in the second area, the ground member is disposed and spaced apart from the sealing member, and the second area may be positioned between the first area and the ground member.

An inner circumferential surface of the second area of the connection portion may be disposed to have a step with respect to an inner circumferential surface of the first area of the connection portion.

The connection portion includes a third area having a third hole having a diameter greater than that of the second hole, and an inner circumferential surface of the third area of the connection portion may be disposed to have a step with respect to an inner circumferential surface of the second area of the connection portion.

The third area may include a lower area being extended from a second area, and a middle area being extended from the lower area so as to include an inner circumferential surface including a round shape.

The third area may include an upper area being extended upward from the middle area of the third area, and the width of the upper area of the third area may increase as it travels away from the middle area.

The inner circumferential surface of the middle area of the third area may be formed to be inclined.

The height of the second area of the connection portion may be greater than the height of the third area of the connection portion.

At least a portion of the ground member may be overlapped with the step of the connection portion in an optical axis direction.

The step of the connection portion may limit movement of the ground member in a downward direction.

The middle area of the third area may guide the ground member to be inserted into the lower area of the third area.

It includes a substrate assembly being disposed inside the second body, wherein the substrate assembly includes a first substrate, a second substrate being disposed below the first substrate, a third substrate electrically connecting the first substrate and the second substrate, and a connector being coupled to the second substrate, wherein a ground member being disposed in the connector and at least partly disposed in the second area of the hole of the second body, and wherein the connector and the ground member may be integrally formed.

The second body is formed of a metal material, an inner circumferential surface of the second area of the connection portion of the second body includes a protective layer, and an inner circumferential surface of the third area of the connection portion of the second body may not include a protective layer.

The metal material may include aluminum, and the protective layer may include anodized layer ($Al_2O_3$ layer).

A camera module according to the present embodiment comprises: a first body including a lens; a second body being coupled to the first body and including a connection portion; and a sealing member and a ground member being disposed in the connection portion of the second body, wherein the connection portion includes a first area having a first hole, a second area having a second hole having a diameter greater than that of the first hole, and a third area having a third hole larger than the diameter of the second hole, wherein the sealing member is disposed in the second area, wherein the grounding member is disposed in the third area, and wherein the second area may be located between the first area and the third area.

A lower end of the sealing member may be in contact with a surface facing the sealing member of the protrusion of the connector lead-out part.

The protruded portion of the connector lead-out part may be disposed at a side more outward than the second area of the connection portion of the second body.

The sealing member is disposed in the first area of the connection portion, at least a portion of the ground member is disposed in the second area of the connection portion, and the height of the first area of the connection portion may be higher than the height of the second area of the connection portion.

The camera module according to the present embodiment comprises: a first body including a lens; a second body being coupled to the first body and including a connection portion; and a sealing member being disposed in the connection portion of the second body and a ground member being disposed on the sealing member, wherein the connection portion includes an inner side surface defining a hole, wherein the inner side surface of the connection portion includes a first step surface and a second step surface, and wherein the sealing member may be disposed between the first step surface and the second step surface.

The sealing member may be inserted into the hole of the connection portion from the inner side of the second body.

Advantageous Effects

Through the present embodiment, it is possible to provide a camera module in which assembly process is minimized through the use of one rear body.

In addition, it is possible to provide a camera module capable of both waterproofing and grounding through one hole, and not requiring separate parts to prevent separation of the ground member and waterproof member.

In addition, it is possible to reduce costs through unification of parts and by eliminating the four screws used for coupling of the conventional two rear bodies.

EMBODIMENT

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

An 'optical axis direction' used hereinafter may be defined as an optical axis direction of a lens. Meanwhile, the 'optical axis direction' may correspond to any one among the 'up and down direction', the 'vertical direction', and the 'z-axis direction'.

Hereinafter, the camera module 10 according to an embodiment of the present invention will be described in more detail with reference to the accompanying drawings.

Figure 1:
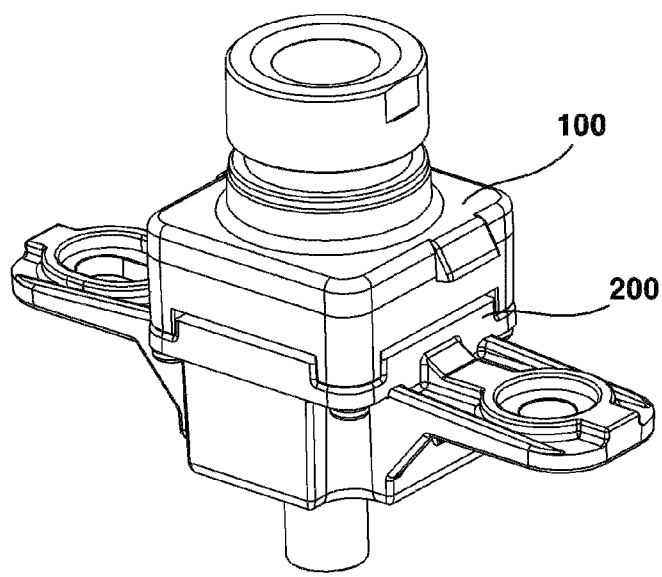
FIG. 1 is a perspective view of a camera module according to the present embodiment.
Figure 2:
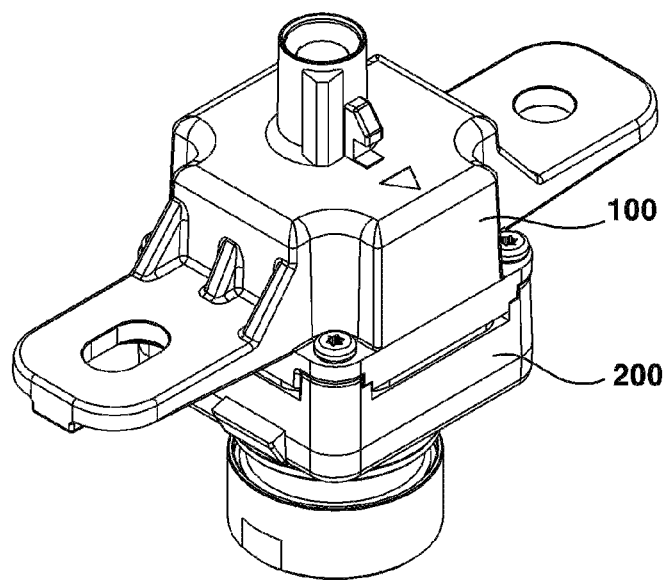
FIG. 2 is a perspective view of a camera module according to the present embodiment viewed from another angle.
Figure 3:
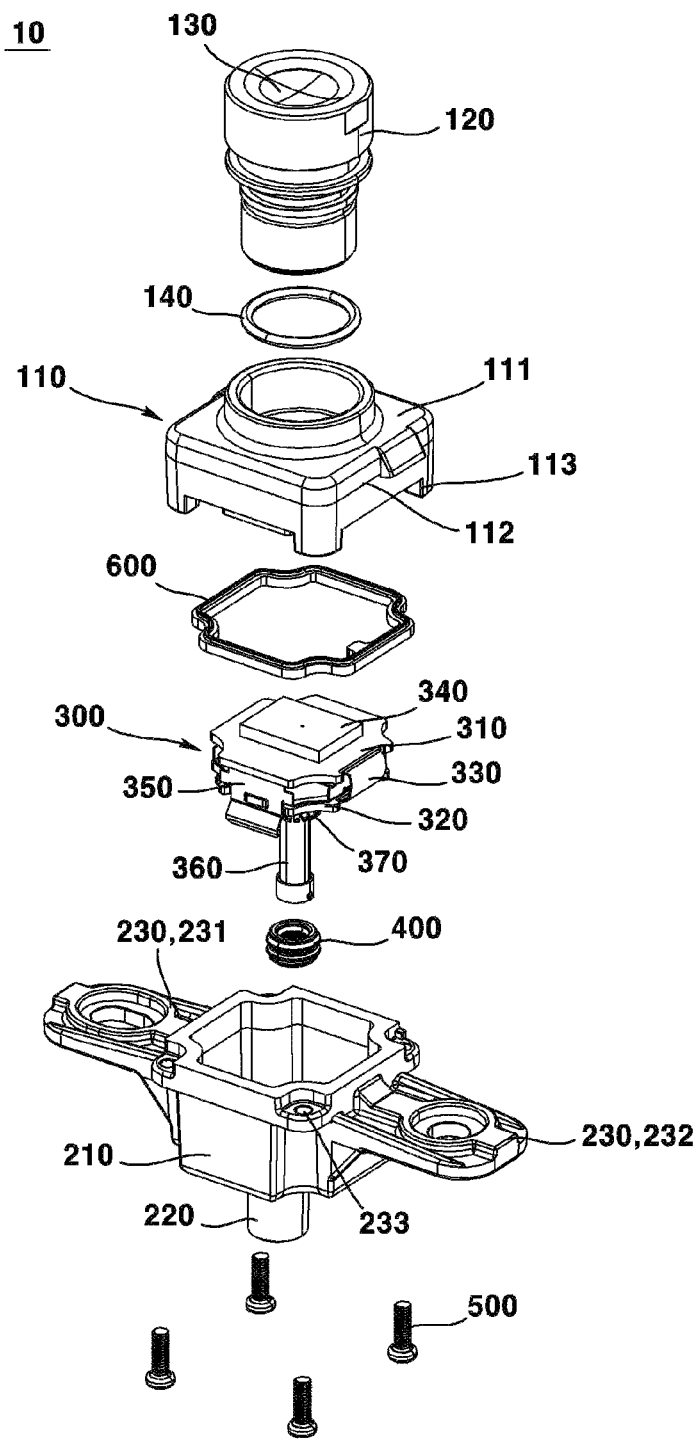
FIG. 3 is an exploded perspective view of a camera module according to the present embodiment.
Figure 4:
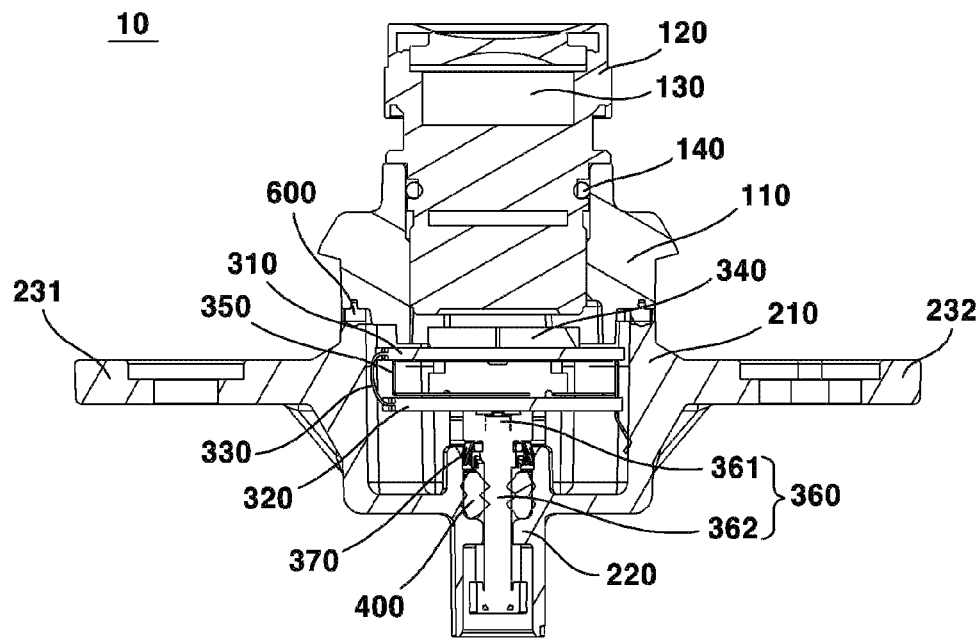
FIG. 4 is a cross-sectional view of a camera module according to the present embodiment.
Figure 5:
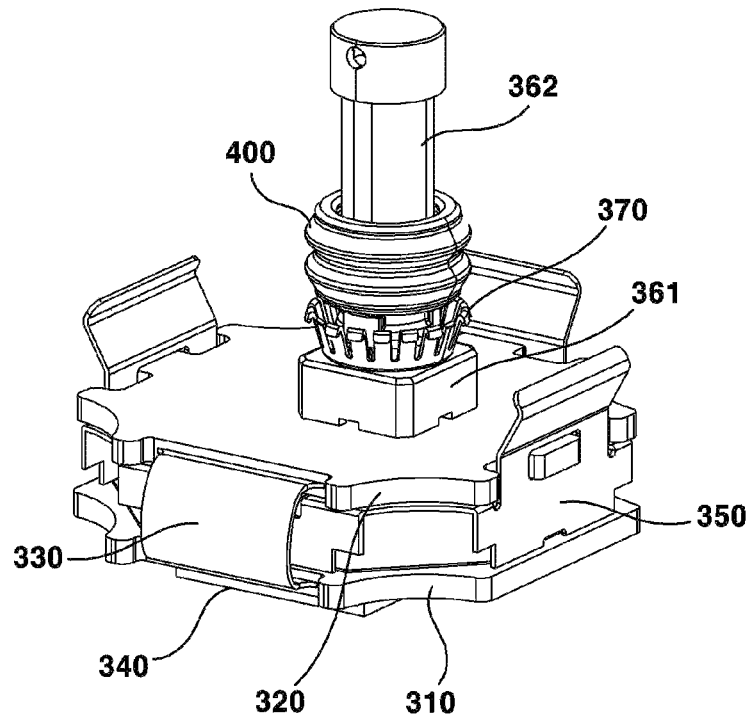
FIG. 5 is a perspective view of a partial configuration of a camera module according to the present embodiment.
Figure 6:
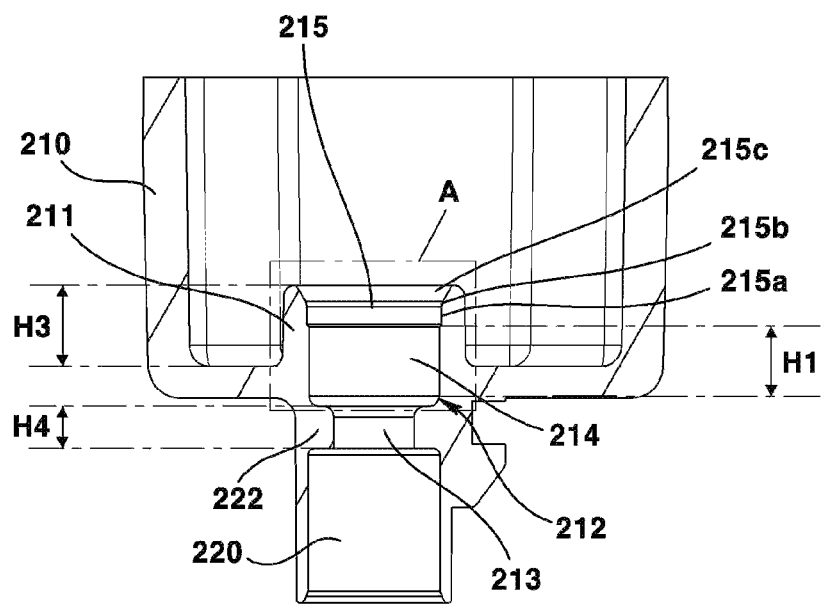
FIG. 6 is a cross-sectional view of a second body of a camera module according to the present embodiment.
Figure 7:
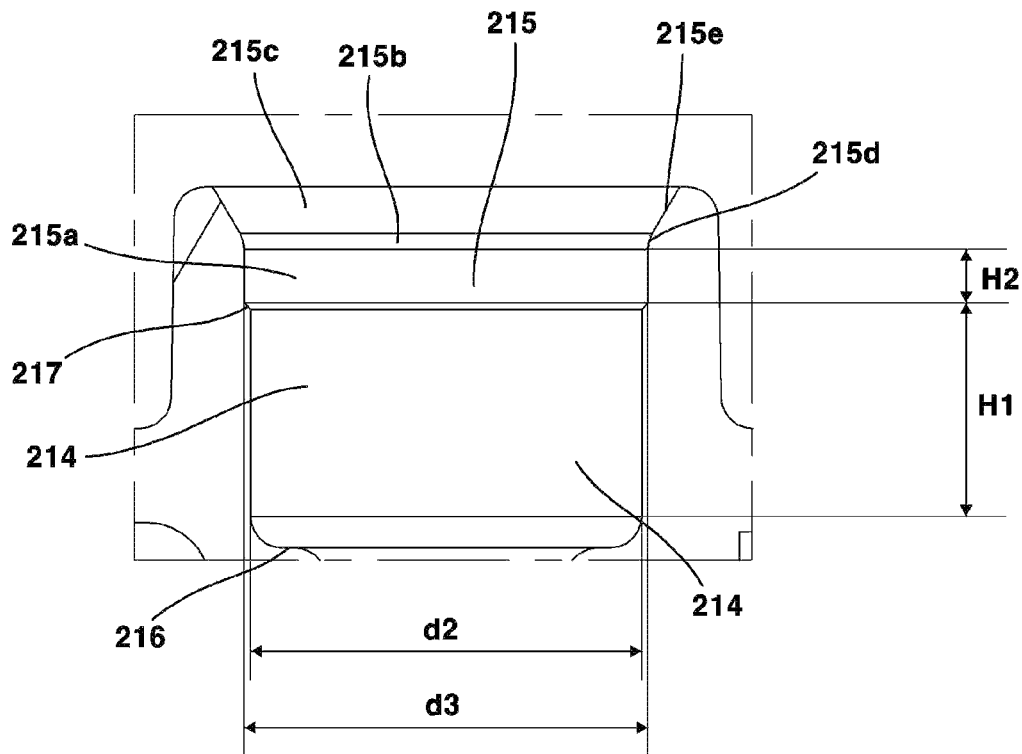
FIG. 7 is an enlarged view of part A of FIG. 6.
Figure 8:
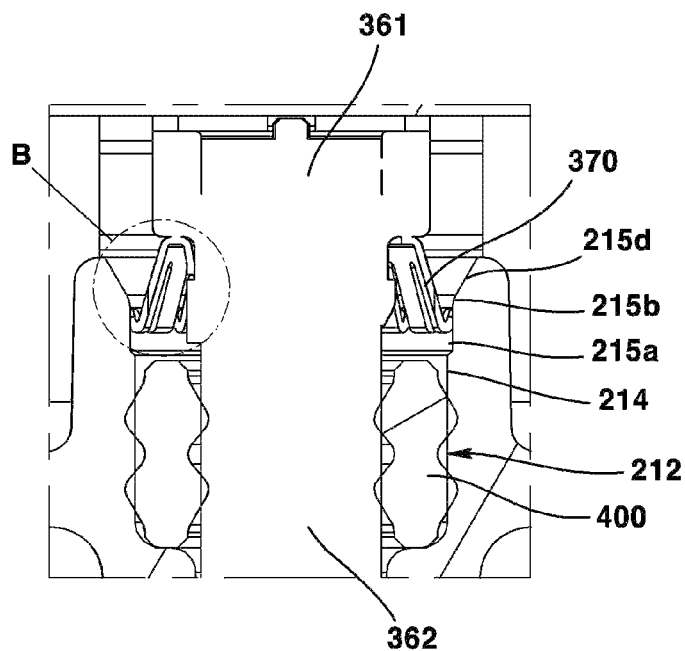
FIG. 8 is a cross-sectional view of a partial configuration of a camera module according to the present embodiment.
Figure 9:
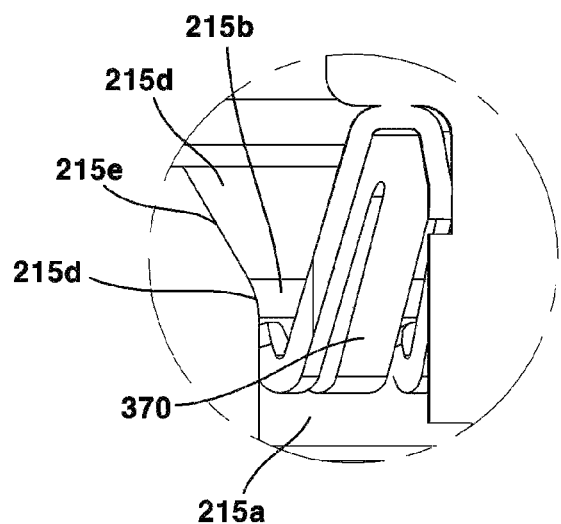
FIG. 9 is an enlarged view of part B of FIG. 8.
Figure 10:
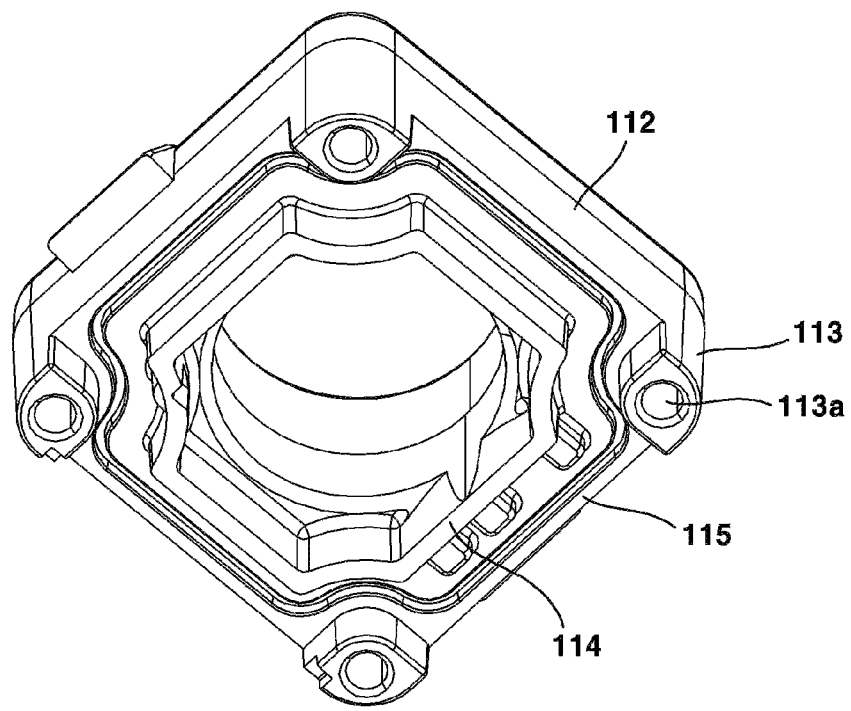
FIG. 10 is a perspective view of a first body of a camera module according to the present embodiment.
Figure 11:
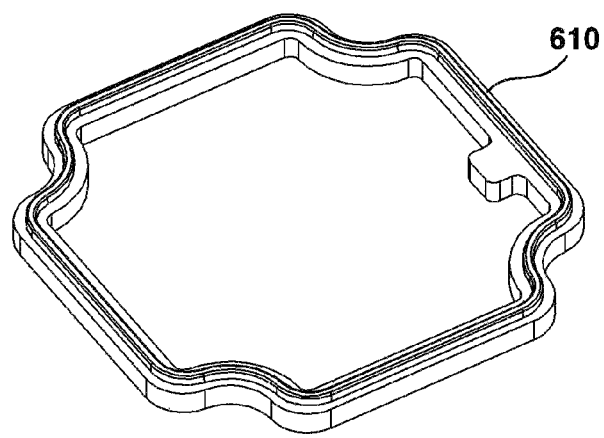
FIG. 11 is a perspective view of a third sealing member according to the present embodiment.

FIG. 1 is a perspective view of a camera module according to the present embodiment; FIG. 2 is a perspective view of a camera module according to the present embodiment viewed from another angle; FIG. 3 is an exploded perspective view of a camera module according to the present embodiment; FIG. 4 is a cross-sectional view of a camera module according to the present embodiment; FIG. 5 is a perspective view of a partial configuration of a camera module according to the present embodiment; FIG. 6 is a cross-sectional view of a second body of a camera module according to the present embodiment; FIG. 7 is an enlarged view of part A of FIG. 6; FIG. 8 is a cross-sectional view of a partial configuration of a camera module according to the present embodiment; FIG. 9 is an enlarged view of part B of FIG. 8; FIG. 10 is a perspective view of a first body of a camera module according to the present embodiment; and FIG. 11 is a perspective view of a third sealing member according to the present embodiment.

The camera module 10 according to an embodiment of the present invention may be a vehicle camera module. The camera module 10 may be coupled to a vehicle. The camera module 10 may be used in any one or more among a front camera, a side camera, a rear camera, and a black box of a vehicle. The camera module 10 may be disposed in front of a vehicle. The camera module 10 may be disposed at a rear of a vehicle. The camera module 10 may be coupled to a windshield of a vehicle. The camera module 10 may be coupled to a windshield at a front or rear of a vehicle. The camera module 10 may be disposed at a side of a vehicle. The camera module 10 may photograph a subject and output it as an image on a display (not shown).

The camera module 10 may include bodies 100 and 200. The bodies 100 and 200 may form the outer appearance of the camera module 10. The bodies 100 and 200 may be formed in a hexahedral shape. However, it is not limited thereto, and the shapes of the bodies 100 and 200 may be variously changed.

The bodies 100 and 200 may include a first body 100. The first body 100 may be referred to as a first housing or a front body. The first body 100 may be formed of a metal material. The first body 100 may be a metal body. The first body 100 may be formed of an aluminum material. The first body 100 may be disposed above the second body 200. The first body 100 may be coupled to a second body 200. The first body 100 may be screw-coupled to the second body 200.

The first body 100 may include a first body part 110. The first body part 110 may include an upper plate 111 and a side plate 112 being extending from the upper plate 111. The first body part 110 may include an upper plate 111 and a plurality of side plates 112 being extended downward from an outer edge of the upper plate 111. The first body part 110 may include a plurality of corners being disposed between the plurality of side plates 112. At least a portion of the lower end of the first body part 110 may be spaced apart from the second body 200. The upper plate 111 may be spaced apart from the second body 200 in an optical axis direction.

The first body part 110 may include a column 113 being protruded downward from a lower end of the upper plate 111. The column 113 may be protruded downward from the corner of the first body part 110. The column 113 may be coupled to the second body 200. The column 113 may include four columns 113 being formed at four corners of the first body part 110. An area between the four columns 113 among the lower ends of the first body part 110 may be spaced apart from the second body 200 in an optical axis direction. The column 113 may include a groove 113a. The groove 113a may be formed by being recessed from the lower end of the column 113. The groove 113a may be aligned with the hole 233 of the second body 200. The central axis of the groove 113a may coincide with the central axis of the hole 233 of the second body 200. A coupling member 500 may be disposed in the groove 113a. The inner circumferential surface of the groove 113a may include a shape corresponding to the outer circumferential surface of the coupling member 500. The inner circumferential surface of the groove 113a may be formed with a screw thread. In a modified embodiment, the groove 113a and the coupling member 500 may be fixed by an adhesive.

The first body part 110 may include a protruded portion 114. The protruded portion 114 may be protruded downward from a lower surface of the upper plate 111 of the first body part 110. The length of the protruded portion 114 in an optical axis direction may be smaller than the length of the column 113 in the corresponding direction. The protruded portion 114 may be disposed at a more inner side than the column 113. The protruded portion 114 may not be protruded below the column 113. A first substrate 310 may be disposed in the protruded portion 114. The protruded portion 114 may be coupled to the first substrate 310. The protruded portion 114 may be coupled to an outer edge of the first substrate 310. The protruded portion 114 may be formed to have a shape corresponding to the shape of the outer edge of the first substrate 310. The protruded portion 114 may be overlapped with at least a portion of the second body 200 in a direction perpendicular to the optical axis direction.

The first body part 110 may include a groove portion 115. The groove portion 115 may be formed by being recessed from a lower surface of the upper plate 111 of the first body part 110. The groove portion 115 and the second body 200 may be spaced apart from each other in an optical axis direction. A third sealing member 600, which will be described later, may be disposed in the groove portion 115. The protruded portion 610 of the third sealing member 600 may be disposed in the groove portion 115. The groove portion 115 may be disposed at a more outer side than the protruded portion 114. The groove portion 115 may be formed between the side plate 112 and the protruded portion 114.

The first body 100 may include a barrel unit 120. The barrel unit 120 may be a lens barrel. The barrel unit 120 may be formed of a plastic material or a metal material. The barrel unit 120 may be coupled to the first body part 110. The barrel unit 120 may be fixed to the first body part 110 by an adhesive. In a modified embodiment, the barrel unit 120 may be extended upward from an upper surface of the upper plate 111 of the first body part 110. In this case, the barrel unit 120 and the first body part 110 may be integrally formed. The barrel unit 120 may be coupled with a lens 130, which will be described later. The barrel unit 120 may accommodate the lens 130 therein. The barrel unit 120 may include a hole. A lens 130 may be disposed in the hole of the barrel unit 120. The inner circumferential surface of the hole of the barrel unit 120 may include a shape corresponding to the shape of the lens 130. A lower portion of the barrel unit 120 may be inserted into the first body part 110, and an upper portion of the barrel unit 120 may be exposed to the outside. The barrel unit 120 may include: a first portion being overlapped with the first body part 110 in a direction perpendicular to the optical axis direction; and a second portion being extended upward from the first portion and not being overlapped with the first body part 110 in a direction perpendicular to the optical axis direction. At this time, the second portion of the barrel unit 120 may be exposed to the outside.

The first body 100 may include a lens 130. The lens 130 may include a plurality of lenses 130. The lens 130 may include a plurality of lenses 130 having different diameters. The lens 130 may be coupled to the barrel unit 120. The lens 130 may be disposed inside the hole of the barrel unit 120. The lens 130 may include a spacer (not shown) being disposed between the plurality of lenses 130. The lens 130 may be aligned with an image sensor 340, which will be described later. The optical axis may be aligned with the image sensor 340 of the lens 130. The optical axis of the lens 130 may coincide with the optical axis of the image sensor 340. The first body 100 may include an infrared filter (IR filter) being disposed between the lens 130 and the image sensor 340.

The first body 100 may include a first sealing member 140. The first sealing member 140 may be referred to as any one of an O-ring and a waterproof member. The first sealing member 140 may be disposed between the first body part 110 and the barrel unit 120. The first sealing member 140 may be disposed between the first body part 110 and the first portion of the barrel unit 120. The first sealing member 140 may prevent moisture from penetrating between the first body part 110 and the barrel unit 120. That is, the first sealing member 140 may perform a waterproof function.

The camera module 10 may include a second body 200. The second body 200 may be referred to as any one of a rear body, a lower housing, and a second housing. The second body 200 may be formed of a metal material. The second body 200 may be a metal body. The second body 200 may be formed in a rectangular shape with an open upper portion. The second body 200 may be disposed below the first body 100. The second body 200 may be coupled to the first body 100. The second body 200 may be screw-coupled to the first body 100. The second body 200 may form an internal space through coupling with the first body 100. A third sealing member 600, which will be described later, may be disposed on an upper portion of the second body 200.

The second body 200 may include a bottom plate. The bottom plate may face the upper plate 111 of the first body part 110 of the first body 100. The bottom plate may be spaced apart from the upper plate 111 of the first body part 110 of the first body 100 in an optical axis direction. The bottom plate may be parallel to the upper plate 111 of the first body part 110 of the first body 100. The bottom plate may be formed in a rectangular shape. In this case, the corner of the bottom plate may include a round shape at least in part.

The second body 200 may include a protruded portion 211 being protruded upward from the bottom plate. At least a portion of the second connector 362 may be disposed inside the protruded portion 211. A second connector 362 may penetrate through the protruded portion 211. The height 113 of the protruded portion 211 in an optical axis direction may be higher than the height H1 in the corresponding direction of the second area 214 of the connection portion 212 of the bottom plate of the second body 200, which will be described later. Inside the protruded portion 211 may include at least a portion of the second area 214 of the connection portion 212 of the bottom plate of the second body 200, a third area 215, a middle area 215b, and an upper area 215c.

The second body 200 may include a connection portion 212. The connection portion 212 may be a connector lead-out part or a cable lead-out part. The connection portion 212 may be formed in the bottom plate of the second body 200. The connection portion 212 may be formed by penetrating through the upper surface and lower surface of the bottom plate of the second body 200. The connection portion 212 may be formed in the protruded portion 211. The connection portion 212 may be formed by penetrating through the protruded portion 211 and the bottom plate of the second body 200. The connection portion 212 may be connected to a hole 221 of a connector lead-out part 220, which will be described later. The connection portion 212 may include an inner side surface defining a hole. The connection portion 212 may include a first step surface 216 between the inner circumferential surface of the first area 213 and the inner circumferential surface of the second area 214. The connection portion 212 may include a second step surface 217 between the inner circumferential surface of the second area 214 and the inner circumferential surface of the third area 215. The second sealing member 400 may be disposed between the first step surface 216 and the second step surface 217. The lower end of the second sealing member 400 may be in contact with the first step surface 216. At least a portion of the ground member 370 may be overlapped with the second step surface 218 in an optical axis direction.

The connection portion 212 may include a first area 213 having a first hole. The first area 213 may be disposed at a lower position than the second area 214. The first area 213 may be disposed at a lower position than the bottom plate 210 of the second body 200. The inner circumferential surface of the first area 213 may be formed by the protruded portion 222. The first area 213 may have a first diameter d2. The first area 213 may have a first diameter d2 in a direction perpendicular to the optical axis direction. The first diameter d2 of the first area 213 may be smaller than the second diameter d2 of the second area 214. The first diameter d2 of the first area 213 may be smaller than the third diameter d3 of the lower area 215a of the third area 215. The inner circumferential surface of the first area 213 may be disposed to have a step with respect to the inner circumferential surface of the second area 214. The height h4 of the first area 213 may be lower than the second height h2 of the second area 214. A height 114 of the first area 213 in an optical axis direction may be lower than a second height h2 of the second area 214. The height 114 of the first area 213 may correspond to the height of the protruded portion 222 in a corresponding direction.

The connection portion 212 may include a second area 214 having a second hole. The second area 214 may be called a waterproof area. The second area 214 may have a second diameter d2. The second area 214 may have a second diameter d2 in a direction perpendicular to the optical axis direction. The second diameter d2 of the second area 214 may be smaller than the minimum diameter in the corresponding direction of the third area 215 of the connection portion 212, which will be described later. The second diameter d2 of the second area 214 may be smaller than the third diameter d3 of the lower area 215a of the third area 215. The second area 214 may be formed below the third area 215. The second area 214 may not be spaced apart from the third area 215 in an optical axis direction. The height H1 of the second area 214 in an optical axis direction may be higher than the height 112 of the third area 215 in an optical axis direction. A second sealing member 400, which will be described later, may be disposed in the second area 214. The second area 214 may be located between the first area 213 and the ground member. A cross-sectional area of the second area 214 in an optical axis direction may be greater than the cross-sectional area of the third area 215 in an optical axis direction. This is to maximize waterproofing by filling the second area 214 with the second sealing member 400 being disposed in a compressed state inside the second area 214. In addition, since the ground member can perform a grounding function when only a portion of the ground member is in contact with the inside of the third area 215, by making the size of the third area 215, which is the ground area, small, and by making the size of the second area 214, which is a waterproof area, large, miniaturization of the camera module 10 may become possible while grounding and waterproofing are possible.

The inner circumferential surface of the second area 214 may be disposed to have a step with respect to the inner circumferential surface of the first area 213. The inner circumferential surface of the second area 214 may be disposed to have a step with respect to the inner circumferential surface of the third area 215. The second area 214 may be disposed between the third area 215 and the first area 213. The second area 214 may be formed between the lower area 215a and the first area 213 of the third area 215. The height H1 of the second area 214 in an optical axis direction may be greater than the height H1 of the third area 215 in an optical axis direction. The height H1 of the second area 214 in an optical axis direction may be greater than the height 112 of the lower area 215a of the third area 215 in an optical axis direction.

The connection portion 212 may include a third area 215 having a third hole. The third area 215 may be called a ground area. The third area 215 may be extended upward from the second area 214. The third area 215 may be formed inside the protruded portion 211. The third area 215 may not be overlapped with the bottom plate of the second body 200 in a direction perpendicular to the optical axis direction. The third area 215 may have a third diameter d3. The third area 215 may have a third diameter d3 in a direction perpendicular to the optical axis direction. The third diameter d3 of the third area 215 may be larger than the second diameter d2 of the second area 214.

The inner circumferential surface of the third area 215 may be formed at an outer side of the inner circumferential surface of the second area 214. The inner circumferential surface of the third area 215 and the inner circumferential surface of the second area 214 may form a step structure. The inner circumferential surface of the third area 215 may be disposed to have a step with respect to the inner circumferential surface of the second area 214. At least a portion of the ground member may be overlapped with the step between the inner circumferential surfaces of the second area 214 of an inner circumferential surface of the third area 215 in an optical axis direction. Through this, it is possible to prevent the ground member from moving downward. That is, it is possible to prevent the ground member from being moved downward by the vibration of the vehicle and being disposed in the second area 214 which is a waterproof area. When the ground member is moved down, the ground member is caught by the step structure between the second area 214 and the third area 215, thereby preventing the movement more downward than the step structure. In addition, since the ground member cannot be moved below the step structure between the second area 214 and the third area 215, the movement to the third area 215, which is the ground area, may be prevented by the ground member when the second sealing member 400 is also extended upward by compression.

The third area 215 may include a lower area 215a. The lower area 215a may be extended from the second area 214. The lower area 215a may be extended upward from the second area 214. The lower area 215a may be disposed between the middle area 215b and the second area 214 of the third area 215.

The third area 215 may include a middle area 215b. The middle area 215b may be extended upward from the lower area 215b. The middle area 215b may have an inner circumferential surface having a round shape 215d. The inner circumferential surface of the middle area 215b may be inclinedly formed. The inner circumferential surface of the middle area 215b may be inclinedly formed with respect to the lower area 215a.

The middle area 215b may be spaced apart from the second area 214 in an optical axis direction. The middle area 215b may be spaced apart from the second area 214 in an optical axis direction by the lower area 215a of the third area 215. The middle area 215b may be extended upward from the lower area 215a. The middle area 215b may be connected to the second area 214 and the lower area 215a. The middle area 215b may be formed between the lower area 215a and the upper area 215c. The diameter of the middle area 215b in a direction perpendicular to the optical axis direction may be greater than the diameter d2 of the second area 214 in a corresponding direction. The minimum diameter of the middle area 215b in a direction perpendicular to the optical axis direction may be greater than the diameter d2 of the second area 214 in a corresponding direction. The minimum diameter of the middle area 215b in a direction perpendicular to the optical axis direction may be the same as the diameter d3 of the lower area 215a in a corresponding direction. The diameter of the middle area 215b in a direction perpendicular to the optical axis direction may increase as it travels away from the lower area 215a in an optical axis direction. The height of the middle area 215b in an optical axis direction may be smaller than the height H1 of the second area 214 in an optical axis direction. The height of the middle area 215b in an optical axis direction may be smaller than the height 112 of the lower area 215a of the third area 215 in an optical axis direction. The inner circumferential surface of the middle area 215b may include a round shape 215d. The inner circumferential surface of the middle area 215b may include a curved surface 215d. The inner circumferential surface of the middle area 215b may include a curvature. The inner circumferential surface of the middle area 215b may be formed to be round at least in part. The lower end of the inner circumferential surface of the middle area 215b may be disposed in the same plane as the inner circumferential surface of the lower area 215a. The inner circumferential surface of the middle area 215b may have a shape bent more outward as it travels from the lower end to the upper end of the inner circumferential surface of the middle area 215b. Through this, when the ground member is inserted into the third area 215 of the connection portion 212, the impact applied to the substrates 410, 420, and 430 can be minimized. In the case of a conventional camera module, when the ground member is inserted into the third area 215 of the connection portion 212, it is inserted together with the connector 360 in a state where the ends of the ground member are gathered, and if there is no round shape of the middle area 215b, a strong force is applied to the board when the ground member is inserted, and in this case, the substrates 410, 420, and 430 are often damaged. However, in the case of the camera module 10 according to the present embodiment, by forming the inner circumferential surface of the middle area 215b to be round, the ground member can be flexibly inserted into the third area 215 of the connection portion 212, so that it is possible to minimize the impact applied to the substrate 410, 420, and 430.

The third area 215 may have an upper area 215c. The upper area 215c may be extended from the middle area 215b. The upper area 215c may be extended upward from the middle area 215b. The width of the upper area 215c may increase as it travels away from the middle area 215b. The width of the upper area 215c in a direction perpendicular to the optical axis direction may increase as it travels away from the middle area 215b.

The connection portion 212 may include an upper area 215c. The upper area 215c may be extended upward from the middle area 215b. The upper area 215c may be formed above the middle area 215b. The diameter of the upper area 215c in a direction perpendicular to the optical axis direction may be greater than the diameter d2 of the second area 214 in a corresponding direction. The maximum diameter of the upper area 215c in a direction perpendicular to the optical axis direction may be greater than the diameter d2 of the second area 214 in a corresponding direction. The diameter of the upper area 215c in a direction perpendicular to the optical axis direction may be greater than the third diameter d1 of the lower area 215a of the third area 215. The maximum diameter of the upper area 215c in a direction perpendicular to the optical axis direction may be greater than the diameter of the third area 215 in a corresponding direction. The minimum diameter of the upper area 215c in a direction perpendicular to the optical axis direction may be the same as the maximum diameter of the middle area 215*b* in a corresponding direction. The diameter of the upper area 215*c* in a direction perpendicular to the optical axis direction may increase as it travels away from the middle area 215*b*. The inner circumferential surface of the upper area 215*c* may include an inclined surface 215*e*. The inner circumferential surface of the upper area 215*c* may be formed to be more inclined outward as it travels away from the middle area 215*b*. Through this, when the ground member is inserted into the hole together with the connector 360, it is possible to guide the ground member. In this case, the impact applied to the substrates 410, 420, and 430 may be minimized.

A protective layer (not shown) may be disposed on the inner circumferential surface of the connection portion 212. The protective layer may be an anodized protective layer ($Al_2O_3$ layer). A protective layer may be formed in the second area 214 which is a waterproof area of the connection portion 212, and a protective layer may not be formed in the third area 215 which is a ground area. The protective layer is formed in the second body 200 that is a metal body to form a waterproof area, and the third area 215 that is a ground area may peel off the protective layer for grounding to expose the metal body.

The second body 200 may include a connector lead-out part 220. The connector lead-out part 220 may be coupled to the bottom plate of the second body 200. A connector 360 may be disposed inside the connector lead-out part 220. A second connector 362 may be disposed inside the connector lead-out part 220. The connector lead-out part 220 may include a hole 221. A connector 360 may be disposed in the hole 211. The hole 221 may accommodate at least a portion of the connector 360. Through this, the connector lead-out part 220 may fix the connector 360. The hole 221 may communicate with the connection portion 212 of the second body 200.

The connector lead-out part 220 may include a protruded portion 222. The protruded portion 221 may be formed by being protruded from the inner circumferential surface of the hole 221 of the connector lead-out part 220. The protruded portion 221 may be formed by being protruded from a partial area of the inner circumferential surface of the hole 221 of the connector lead-out part 220. The protruded portion 221 may be disposed below the connection portion 212 of the second body 200. In the protruded portion 221, the connection portion 212 of the second body 200 may be disposed below the second area 214. The protruded portion 222 may be disposed more outward than the second area 214 of the connection portion 212. The protruded portion 222 may be disposed at a lower position than the bottom plate 210 of the second body 200. The protruded portion 222 may be disposed below the second sealing member 400. The protruded portion 222 may be overlapped with the second sealing member 400 in an optical axis direction. The protruded portion 222 may support the second sealing member 400. The protruded portion 222 may include a first surface, a second surface disposed opposite to the first surface; and a third surface connecting the first surface and the second surface and parallel to an inner circumferential surface of the hole 221 of the connector lead-out part 220. The first surface of the protruded portion 222 may face the second sealing member 400. A second connector 362 may be disposed in the first surface of the protruded portion 222. A second sealing member 400 may be disposed in the first surface of the protruded portion 222. Through this, it is possible to prevent the second sealing member 400 from being detached and removed in a direction opposite to the direction toward the lens 130. In more detail, the second sealing member 400 is inserted and assembled from the inside of the second body 200 into the second area 214 of the connection portion 212 of the second body 200, and at this time, it is possible to prevent the second sealing member 400 from being detached and removed in a direction opposite to the direction toward the lens 130. In the case of a conventional camera module, the sealing member is inserted and assembled through the hole of the connector lead-out part from the outside of the second body. In this case, in order to prevent the sealing member from being detached and removed in a direction opposite to the direction toward the lens, a separate cover member is disposed to seal the lower end of the connector lead-out part, and thus, there are problems in the increase in the number of parts, the complexity of the structure, and the increase in assembly man-hours. In the camera module 10 according to the present embodiment, the second sealing member 400 is assembled by inserting it from the inside of the second body 200 and through supporting the second sealing member 400 through the protruded portion 222 being protruded from the inner circumferential surface of the hole 221 of the connector lead-out part 220, even if there is no separate cover member, it is possible to prevent the detachment of the second sealing member 400.

The second body 200 may include a side plate 210. The side plate 210 may be extended upward from the bottom plate of the second body 200. The side plate 210 may include a first side plate, a second side plate, a third side plate being disposed at an opposite side of the first side plate, and a fourth side plate being disposed at an opposite side of the second side plate. The second body 200 may include four corners being formed between the first to fourth side plates.

The second body 200 may include a coupling part 230. The coupling part 230 may be used when the camera module 10 is coupled to a vehicle or the like. The coupling part 230 may include a first coupling part 231 and a second coupling part 232 being disposed opposite to the first coupling part 231. The first coupling part 231 may be extended outwardly from an upper portion of the first side plate of the second body 200. The second coupling part 232 may be extended outwardly from an upper portion of the third side plate of the second body 200.

The second body 200 may include a hole 233. The hole 233 may be formed in an upper surface of the second body 200. The hole 233 may be formed in an area corresponding to the four corners of the second body 200. The hole 233 may be penetrated by a coupling member 500, which will be described later. Through this, the coupling member 500 may couple the first body 100 and the second body 200 to each other. The central axis of the hole 233 may be concentric with the central axis of the groove 113*a* of the first body 100.

The camera module 10 may include a substrate assembly 300. The substrate assembly 300 may be disposed inside the second body 200. The substrate assembly 300 may be disposed in an internal space formed by coupling the first body 100 and the second body 200.

The substrate assembly 300 may include a first substrate 310. The first substrate 310 may include a printed circuit board. The first substrate 310 may include a rigid printed circuit board. An image sensor 340 may be disposed in the first substrate 310. In this case, the first substrate 310 may be referred to as a sensor substrate. The first substrate 310 may include a first surface facing the first body part 110 of the first body 100 and a second surface being disposed at an opposite side of the first surface. The image sensor 340 may be disposed on the first surface of the first substrate 310. The first substrate 310 may be coupled to the first body 100. The first substrate 310 may be coupled to the protruded portion 114 of the first body 100. In an outer edge area of the first surface of the first substrate 310, the first body 100 may be coupled to the protruded portion 114.

The substrate assembly 300 may include a second substrate 320. The second substrate 320 may include a printed circuit board. The second substrate 320 may include a rigid printed circuit board. The second substrate 320 may be disposed below the first substrate 310. The second substrate 320 may be spaced apart from the first substrate 310. The second substrate 320 may be spaced apart from the first substrate 310 in an optical axis direction. The second substrate 320 may supply power to the first substrate 310. The second substrate 320 may be disposed parallel to the first substrate 310. The second substrate 320 may be electrically connected to the connector 360. The second substrate 320 may include a first surface facing the first substrate 310 and a second surface being disposed at an opposite side of the first surface. A connector 360 may be disposed on the second surface of the second substrate 320. A first connector 361 may be disposed on a second surface of the second substrate 320. The second substrate 320 may be electrically connected to the first connector 361.

The substrate assembly 300 may include a third substrate 330. The third substrate 330 may include a flexible printed circuit board (FPCB). The third substrate 330 may electrically connect the first substrate 310 and the second substrate 320. One end of the third substrate 330 may be connected to the first substrate 310, and the other end of the third substrate 330 may be connected to the second substrate 320. The third substrate 330 may have elasticity.

The substrate assembly 300 may include a shield member 350. The shield member 350 may be referred to as a spacer. The shield member 350 may be referred to as a shield can. The shield member 350 may be referred to as an electromagnetic wave shielding member. The shield member 350 may block electromagnetic interference (EMI) or electromagnetic waves.

The shield member 350 may be disposed below the first substrate 310. The shield member 350 may be disposed above the second substrate 320. The shield member 350 may be disposed between the first substrate 310 and the second substrate 320. The shield member 350 may separate the first substrate 310 and the second substrate 320 in an optical axis direction.

The substrate assembly 300 may include a connector 360. The connector 360 may electrically connect a cable (not shown) and the second substrate 420. The connector 360 includes a first connector 361 being electrically connected to the second substrate 320, and a second connector being extended from the first connector 361 and electrically connecting the first connector 361 and the cable 362. The first connector 361 may be disposed in the second surface of the second substrate 320. The first connector 361 may be fixed to a second surface of the second substrate 320. The first connector 361 may be electrically connected to the second substrate 420. The second connector 362 may be electrically connected to the first connector 361. The second connector 362 may be electrically connected to the cable. The second connector 362 may be disposed inside the connector lead-out part 220 of the second body 200 of the second body 200. At least a portion of the second connector 362 is disposed inside the connector lead-out part 220 of the second body 200, and the remaining portion of the second connector 362 may be disposed inside the protruded portion 211 of the second body 200.

The substrate assembly 300 may include a ground member. The ground member may include a washer. The ground member may be integrally formed with the connector 360. The ground member may be coupled to the first connector 361. A second connector 362 may be disposed inside the ground member. One end of the ground member may be coupled to the first connector 361, and the other end of the ground member may not be in contact with the first and second connectors 362. The ground member may serve as a ground as the other end being disposed at an opposite side of the one end being in contact with the first connector 361 is contacted with the second area, which is the ground area. At this time, as long as some of all areas of the ground member come into contact with the second area, the ground function may be performed. Referring to FIG. 8, the other end of the ground member of the camera module 10 according to the present embodiment may be disposed at a position of half of the height H2(1/H2) in an optical axis direction of the second area. However, it is not limited thereto, and as mentioned above, the ground member may be grounded as long as it comes in contact with some of all areas in the second area. The ground member may be formed in a circular ring shape. The ground member may include a first portion being coupled to the first connector 361 and a second portion being extended downward from the first portion. The first portion may be formed in a circular ring shape. The first portion may include an extension portion being extended downward from the surface being in contact with the first connector 361. The extension portion may be in contact with an outer circumferential surface of the second connector 362. The extension portion may be coupled to the protruded portion being protruded from an outer circumferential surface of the second connector 362. The diameter of the second portion may increase as it travels downward from the first portion. The second portion may be disposed inclinedly with respect to the first portion. The second portion may be formed in a tapered shape with respect to the first portion. The second portion may include a plurality of lobes. The plurality of lobes may be spaced apart from each other. Through this, the second part may have elasticity. Through this, the second portions may be gathered along the inclined surface 215e of the upper area 215c of the third area 215. A lower end of the second portion may include a portion bent in a direction toward the first portion. The bent portion of the second portion may be in contact with an inner circumferential surface of the lower area 215a of the third area 215 of the connection portion 212.

The ground member may be inserted into the hole of the connection portion 212 from the inside of the second body 200. The ground member may be inserted into the third area 215 of the connection portion 212 inside the second body 200. The ground member may be fit-coupled into the connection portion 212 of the second body 200. The ground member may be fit-coupled into the third area 215 of the connection portion 212 of the second body 200. In this case, the second portion of the ground member may be inserted and guided by the inclined surface 215e of the upper area 215c of the third area 215. At this time, the plurality of lobes of the second part may be inserted while being gathered inward.

The camera module 10 may include a second sealing member 400. The second sealing member 400 may be a waterproof member. The second sealing member 400 may be formed of a material having elasticity. The second sealing member 400 may be disposed in a first area of the hole. The second sealing member 400 may be disposed in a first area in a state of being compressed. The second sealing member 400 disposed in a first area may fill the inside of the first area as the compressed state is being relieved. Through this, it is possible to prevent moisture from penetrating between the second body 200 and the connector 360. The second sealing member 400 may be spaced apart from the ground member in an optical axis direction. The second sealing member 400 may not be disposed in a second area. The second sealing member 400 may not be overlapped with a second area in a direction perpendicular to the optical axis direction. The second sealing member 400 may be overlapped with a first area in a direction perpendicular to the optical axis direction. The second sealing member 400 may be overlapped with the ground member in an optical axis direction. A lower end of the second sealing member 400 may be in contact with a surface facing the second sealing member 400 of the protruded portion 222 of the connector lead-out part 220. The second sealing member 400 may be inserted into the hole of the connection portion 212 from the inner side of the second body 200. The second sealing member 400 may be inserted into the connection portion 212 from the inner side of the second body 200.

The camera module 10 may include a coupling member 500. The coupling member 500 may couple the first body 100 and the second body 200. The coupling member 500 may screw-couple the first body 100 and the second body 200 to each other. The coupling member 500 may include a screw. The coupling member 500 may include a screw. A screw thread may be formed on an outer conferential surface of the coupling member 500.

The camera module 10 may include a third sealing member 600. The third sealing member 600 may be referred to as any one of a gasket and a waterproof member. The third sealing member 600 may be formed of an elastic material. The third sealing member 600 may be formed in a shape corresponding to the groove portion 115 of the first body part 110. The third sealing member 600 may be formed in a shape corresponding to the shape of the outer edge of the first substrate 310. The third sealing member 600 may be formed to be larger than the outer edge of the first substrate 310. The third sealing member 600 may be disposed on the first body part 110 of the first body 100. The third sealing member 600 may be disposed between the first body 100 and the second body 200. The third sealing member 600 may be disposed in a space between the first body 100 and the second body 200. The height of the third sealing member 600 in an optical axis direction may be smaller after assembling than before assembling. That is, the third sealing member 600 may be disposed between the first body 100 and the second body 200 in a state of being compressed in an optical axis direction to perform a waterproof function. Through this, it is possible to prevent moisture from penetrating through the space between the first body 100 and the second body 200.

The third sealing member 600 may include a protruded portion 610. The protruded portion 610 may be protruded from at least a portion of a surface of the third sealing member 600 facing the first body 100. The protruded portion 610 may be inserted into the groove portion 115 of the first body part 110. The protruded portion 610 and the groove portion 115 of the first body part 110 may prevent the third sealing member 600 from moving when the first body 100 and the second body 200 are assembled. That is, when assembling the first body 100 and the second body 200, the third sealing member 600 is coupled to the first body 100 while the second body 200 is mounted on the first body 100, and at this time, the third sealing member 600 may serve to guide the position so that it does not deviate from the original position.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera module comprising:
a first body comprising a lens;
a second body being coupled to the first body and comprising a connection portion; and
a sealing member and a ground member being disposed in the connection portion of the second body,
wherein the connection portion comprises a first area having a first hole, a second area having a second hole of which a diameter of the second hole is greater than a diameter of the first hole, and a third area connected to the second area,
wherein the sealing member is disposed in the second area,
wherein the ground member is disposed in the third area, and
wherein the third area comprises a first portion extending from the second area and a second portion extending from the first portion such that the first portion is located between the second portion and the second area, the second portion comprising an inner circumferential surface having a round shape.

2. The camera module according to claim 1, wherein the ground member is spaced apart from the sealing member.

3. The camera module according to claim 1, wherein an inner circumferential surface of the second area of the connection portion is disposed to have a step with respect to an inner circumferential surface of the first area of the connection portion.

4. The camera module according to claim 1, wherein the third area of the connection portion has a third hole having a diameter greater than that of the second hole.

5. The camera module according to claim 1, wherein an inner circumferential surface of the third area of the connection portion is disposed to have a step with respect to an inner circumferential surface of the second area of the connection portion.

6. The camera module according to claim 5, wherein at least a portion of the ground member is overlapped with the step of the connection portion in an optical axis direction.

7. The camera module according to claim 5, wherein the step of the connection portion limits movement of the ground member towards the sealing member.

8. The camera module according to claim 1, wherein the third area further comprises a third portion extending from the second portion of the third area such that the second portion is located between the third portion and the first portion, and
wherein a width of the third portion of the third area in a direction perpendicular to an optical axis direction increases as the third portion extends away from the second portion.

9. The camera module according to claim 1, wherein the second portion of the third area guides the ground member to be inserted into the first portion of the third area.

10. The camera module according to claim 1, further comprising a substrate assembly being disposed inside the second body, wherein the substrate assembly comprises a first substrate, a second substrate being disposed below the first substrate, a third substrate electrically connecting the first substrate and the second substrate, and a connector being coupled to the second substrate, wherein the ground member is disposed in the connector and at least partly disposed in the second area of the second body, and wherein the connector and the ground member are integrally formed.

11. A camera module comprising:

a first body comprising a lens;

a second body being coupled to the first body and comprising a connection portion; and a sealing member and a ground member being disposed in the connection portion of the second body, wherein the connection portion comprises a first area having a first hole, a second area having a second hole having a diameter greater than that of the first hole, and a third area having a third hole larger than the diameter of the second hole, wherein the sealing member is disposed in the second area, wherein the ground member is disposed in the third area, wherein the second area is located between the first area and the third area, wherein the third area comprises:
  a first portion extending from the second area;
  a second portion extending from the first portion such that the first portion is located between the second portion and the second area, the second portion comprising an inner circumferential surface having a round shape; and
  a third portion extending from the second portion of the third area such that the second portion is located between the third portion and the first portion, and wherein a width of the third portion of the third area in a direction perpendicular to an optical axis increases as the third portion extends away from the second portion.

12. The camera module according to claim 11, further comprising a connector lead-out part coupled to a plate of the second body, the plate being spaced from the first body, wherein the connector lead-out part comprises a protruded portion protruding from an inner circumferential surface of a hole, and wherein the second area of the connection portion of the second body is located between the protruded portion of the connector lead-out part and the third area of the connection portion of the second body.

13. The camera module according to claim 11, wherein the sealing member is disposed in the second area of the connection portion, and wherein at least a portion of the ground member is disposed in the third area of the connection portion.

14. The camera module according to claim 11, wherein an inner circumferential surface of the second area of the connection portion is disposed to have a step with respect to an inner circumferential surface of the first area of the connection portion, and wherein an inner circumferential surface of the third area of the connection portion is disposed to have a step with respect to an inner circumferential surface of the second area of the connection portion.

15. A camera module comprising:

a first body comprising a lens;

a second body being coupled to the first body and comprising a connection portion; and a sealing member being disposed in the connection portion of the second body and a ground member being disposed on the sealing member, wherein the connection portion comprises an inner side surface defining a hole, wherein the inner side surface of the connection portion comprises a first step surface and a second step surface, wherein the sealing member is disposed between the first step surface and the second step surface, wherein the connection portion comprises a first area having a first hole, a second area having a second hole of which a diameter of the second hole is greater than a diameter of the first hole, and a third area connected to the second area, wherein the sealing member is disposed in the second area, wherein the ground member is disposed in the third area, and wherein the third area comprises a first portion extending from the second area and a second portion extending from the first portion such that the first portion is located between the second portion and the second area, the second portion comprising an inner circumferential surface having a round shape.

16. The camera module according to claim 15, wherein the sealing member is configured to be inserted into the hole of the connection portion from an inner side of the second body.

17. The camera module according to claim 15, wherein the third portion has a third hole larger than the diameter of the second hole, wherein the first step surface is disposed between an inner circumferential surface of the first area and an inner circumferential surface of the second area, and wherein the second step surface is disposed between the inner circumferential surface of the second area and an inner circumferential surface of the third area.

18. The camera module according to claim 15, wherein at least a portion of the ground member is overlapped with the second step surface of the connection portion in an optical axis direction.

* * * * *